United States Patent
Hashimoto

(10) Patent No.: US 7,508,939 B2
(45) Date of Patent: Mar. 24, 2009

(54) IMAGE PROCESSING SYSTEM AND METHOD FOR PROCESSING IMAGE DATA USING THE SYSTEM

(75) Inventor: Minoru Hashimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 10/993,632

(22) Filed: Nov. 18, 2004

(65) Prior Publication Data

US 2005/0105722 A1    May 19, 2005

(30) Foreign Application Priority Data

Nov. 19, 2003    (JP)    ............................ 2003-389682

(51) Int. Cl.
 *H04L 9/00* (2006.01)
 *H04L 15/34* (2006.01)

(52) U.S. Cl. .................... 380/51; 380/54; 380/278; 380/283; 713/162

(58) Field of Classification Search .......... 380/51, 380/54, 278, 283; 713/162
See application file for complete search history.

(56) References Cited

U.S. PATENT DOCUMENTS

| | | | | |
|---|---|---|---|---|
| 4,853,961 A * | 8/1989 | Pastor | ................ | 713/176 |
| 5,633,932 A * | 5/1997 | Davis et al. | ................ | 713/176 |
| 5,903,646 A * | 5/1999 | Rackman | ................ | 705/51 |
| 6,185,681 B1 * | 2/2001 | Zizzi | ................ | 713/165 |
| 6,289,450 B1 * | 9/2001 | Pensak et al. | ................ | 713/167 |
| 6,339,825 B2 * | 1/2002 | Pensak et al. | ................ | 713/158 |
| 6,353,888 B1 * | 3/2002 | Kakehi et al. | ................ | 713/168 |
| 6,378,070 B1 * | 4/2002 | Chan et al. | ................ | 713/155 |
| 6,449,721 B1 * | 9/2002 | Pensak et al. | ................ | 713/171 |
| 6,711,677 B1 * | 3/2004 | Wiegley | ................ | 713/151 |
| 6,751,732 B2 * | 6/2004 | Strobel et al. | ................ | 713/176 |
| 6,965,996 B2 * | 11/2005 | Hirano et al. | ................ | 713/176 |
| 6,971,007 B1 * | 11/2005 | Currans | ................ | 713/165 |
| 6,978,376 B2 * | 12/2005 | Giroux et al. | ................ | 713/189 |
| 7,003,667 B1 * | 2/2006 | Slick et al. | ................ | 713/182 |
| 7,020,781 B1 * | 3/2006 | Saw et al. | ................ | 705/51 |
| 7,103,182 B2 * | 9/2006 | Parry | ................ | 380/51 |
| 7,171,567 B1 * | 1/2007 | Bayer et al. | ................ | 713/193 |
| 7,248,693 B1 * | 7/2007 | Tretter et al. | ................ | 380/55 |
| 7,296,157 B2 * | 11/2007 | Partelow et al. | ................ | 713/171 |
| 7,299,500 B1 * | 11/2007 | Klebe et al. | ................ | 726/26 |
| 7,305,556 B2 * | 12/2007 | Slick et al. | ................ | 713/169 |
| 7,308,572 B2 * | 12/2007 | Goh et al. | ................ | 713/152 |
| 7,324,648 B1 * | 1/2008 | Deaver et al. | ................ | 380/278 |
| 7,343,402 B2 * | 3/2008 | Hagiwara | ................ | 709/220 |
| 7,349,543 B2 * | 3/2008 | Simpson et al. | ................ | 380/270 |

(Continued)

FOREIGN PATENT DOCUMENTS

JP    08-023442 A    1/1996

*Primary Examiner*—David G Cervetti
(74) *Attorney, Agent, or Firm*—Canon U.S.A. Inc., I.P. Division

(57) ABSTRACT

In an image processing system according to the present invention, a first device encrypts image data generated by reading an image in a document, stores a decryption key for decrypting the image data, and transmits the image data to a data storing device. A second device receives the image data from the data storing device, sends a request for the decryption key to the first device and receives the decryption key, decrypts the image data with the decryption key, and performs print processing on the image data. Thus, users can easily perform print processing without the need to remember authentication and printer information.

19 Claims, 12 Drawing Sheets

U.S. PATENT DOCUMENTS

| | | | |
|---|---|---|---|
| 7,362,860 B2* | 4/2008 | Hayashi | 380/210 |
| 7,367,060 B2* | 4/2008 | Someshwar | 726/27 |
| 7,380,120 B1* | 5/2008 | Garcia | 713/160 |
| 7,434,048 B1* | 10/2008 | Shapiro et al. | 713/165 |
| 2001/0052074 A1* | 12/2001 | Pensak et al. | 713/167 |
| 2002/0016921 A1* | 2/2002 | Olsen et al. | 713/200 |
| 2002/0029340 A1* | 3/2002 | Pensak et al. | 713/182 |
| 2002/0042884 A1* | 4/2002 | Wu et al. | 713/201 |
| 2002/0078361 A1* | 6/2002 | Giroux et al. | 713/183 |
| 2002/0129255 A1* | 9/2002 | Tsuchiyama et al. | 713/176 |
| 2002/0131593 A1* | 9/2002 | Parry | 380/51 |
| 2003/0014640 A1* | 1/2003 | Loyd | 713/182 |
| 2003/0014651 A1* | 1/2003 | Strobel et al. | 713/189 |
| 2003/0023559 A1* | 1/2003 | Choi et al. | 705/51 |
| 2003/0081775 A1* | 5/2003 | Campagna et al. | 380/46 |
| 2003/0083996 A1* | 5/2003 | Fischer | 705/52 |
| 2003/0099353 A1* | 5/2003 | Goh et al. | 380/51 |
| 2003/0105963 A1* | 6/2003 | Slick et al. | 713/171 |
| 2003/0182475 A1* | 9/2003 | Gimenez | 710/8 |
| 2004/0008842 A1* | 1/2004 | Partelow et al. | 380/51 |
| 2004/0034654 A1* | 2/2004 | Simpson et al. | 707/103 R |
| 2004/0117655 A1* | 6/2004 | Someshwar | 713/201 |
| 2004/0165212 A1* | 8/2004 | Hagiwara | 358/1.15 |
| 2004/0165723 A1* | 8/2004 | Yoda et al. | 380/44 |
| 2004/0177251 A1* | 9/2004 | Hayashi | 713/161 |
| 2004/0184064 A1* | 9/2004 | TaKeda et al. | 358/1.13 |
| 2004/0205099 A1* | 10/2004 | Hagiwara | 709/200 |
| 2005/0021587 A1* | 1/2005 | Takano et al. | 709/200 |
| 2005/0097335 A1* | 5/2005 | Shenoy et al. | 713/182 |
| 2005/0097347 A1* | 5/2005 | Josephsen et al. | 713/200 |
| 2005/0102512 A1* | 5/2005 | Goh et al. | 713/168 |
| 2005/0132195 A1* | 6/2005 | Dietl | 713/176 |
| 2005/0163549 A1* | 7/2005 | Shima et al. | 400/62 |
| 2005/0275866 A1* | 12/2005 | Corlett | 358/1.14 |
| 2007/0019810 A1* | 1/2007 | Suzue | 380/203 |
| 2007/0050696 A1* | 3/2007 | Piersol et al. | 715/500 |
| 2007/0226174 A1* | 9/2007 | Saito | 707/1 |
| 2008/0181414 A1* | 7/2008 | Deaver et al. | 380/279 |
| 2008/0201784 A1* | 8/2008 | Someshwar | 726/28 |

* cited by examiner

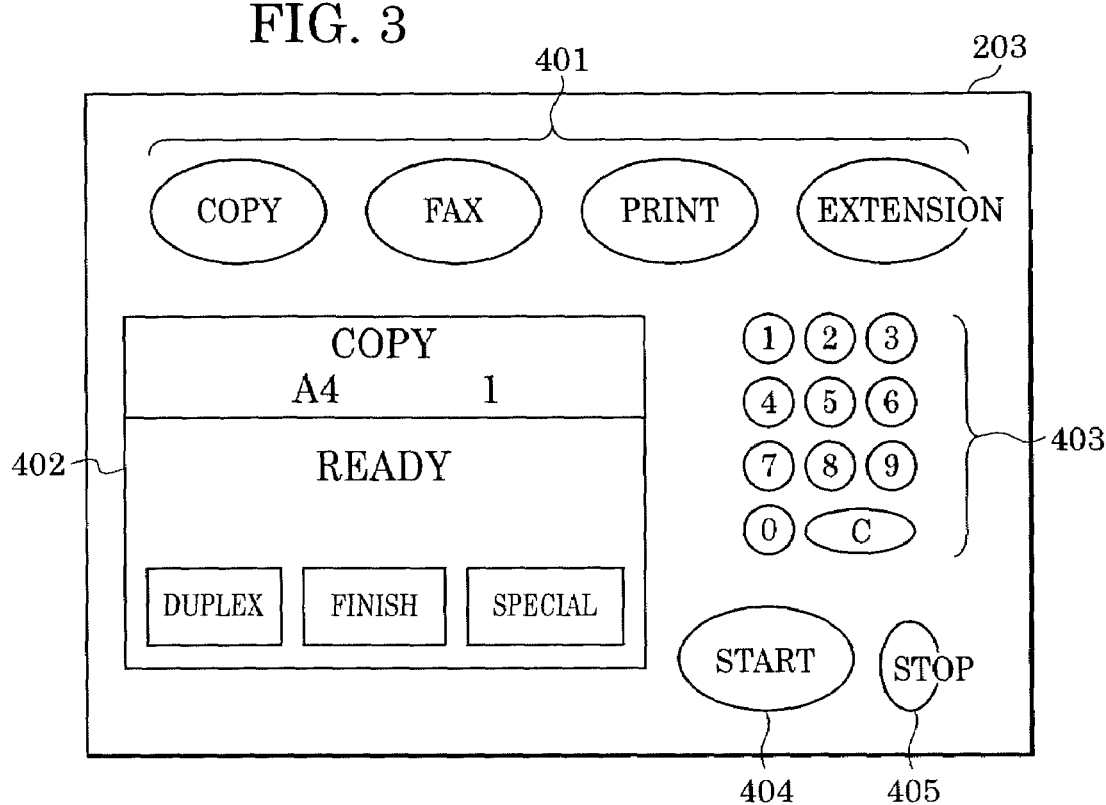
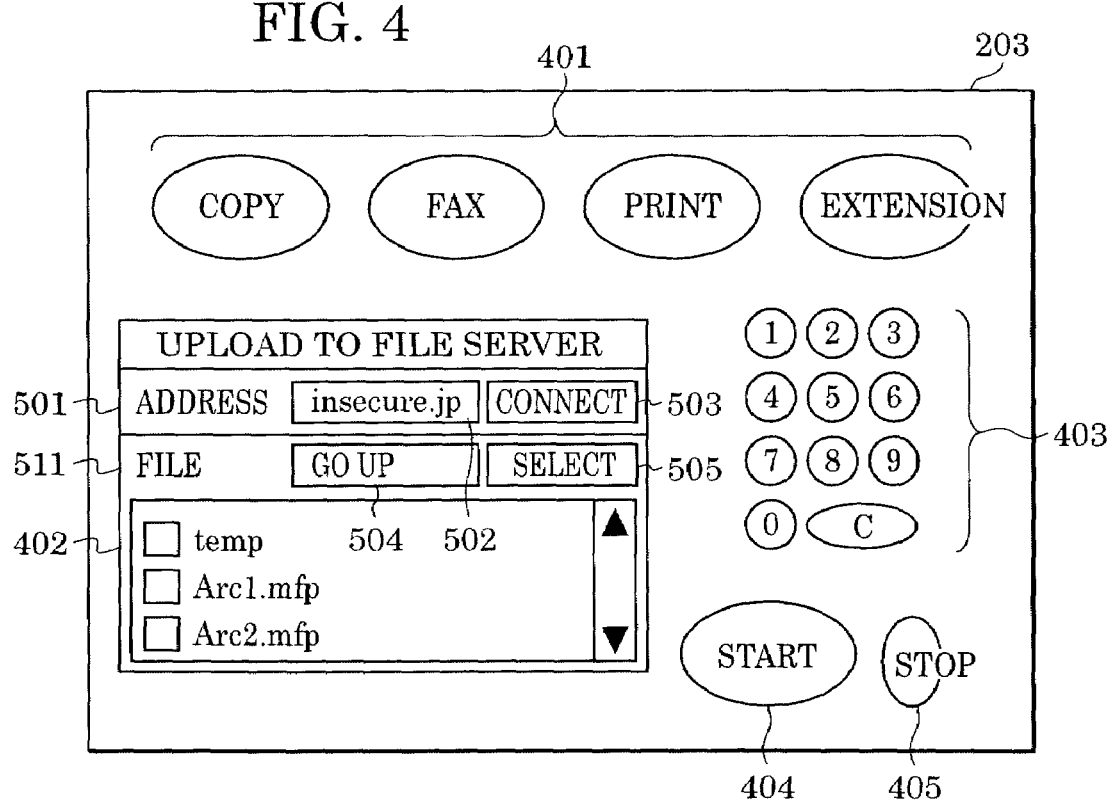

FIG. 11

| FILE NAME | ENCRYPTION KEY |
|---|---|
| C0312001.mfp, | 789FE689 |
| C0315002.mfp, | 12197AB7 |
| C0315003.mfp, | 197890BB |
| C0324004.mfp, | A7845828 |
| C0330005.mfp, | 179BC912 |
| C0401006.mfp, | 799A3B53 |
| C0404007.mfp, | FD891BCA |
| C0405008.mfp, | 1A78BDBD |
| C0409009.mfp, | 7697DEE0 |
| C0412010.mfp, | 0127DBCA |

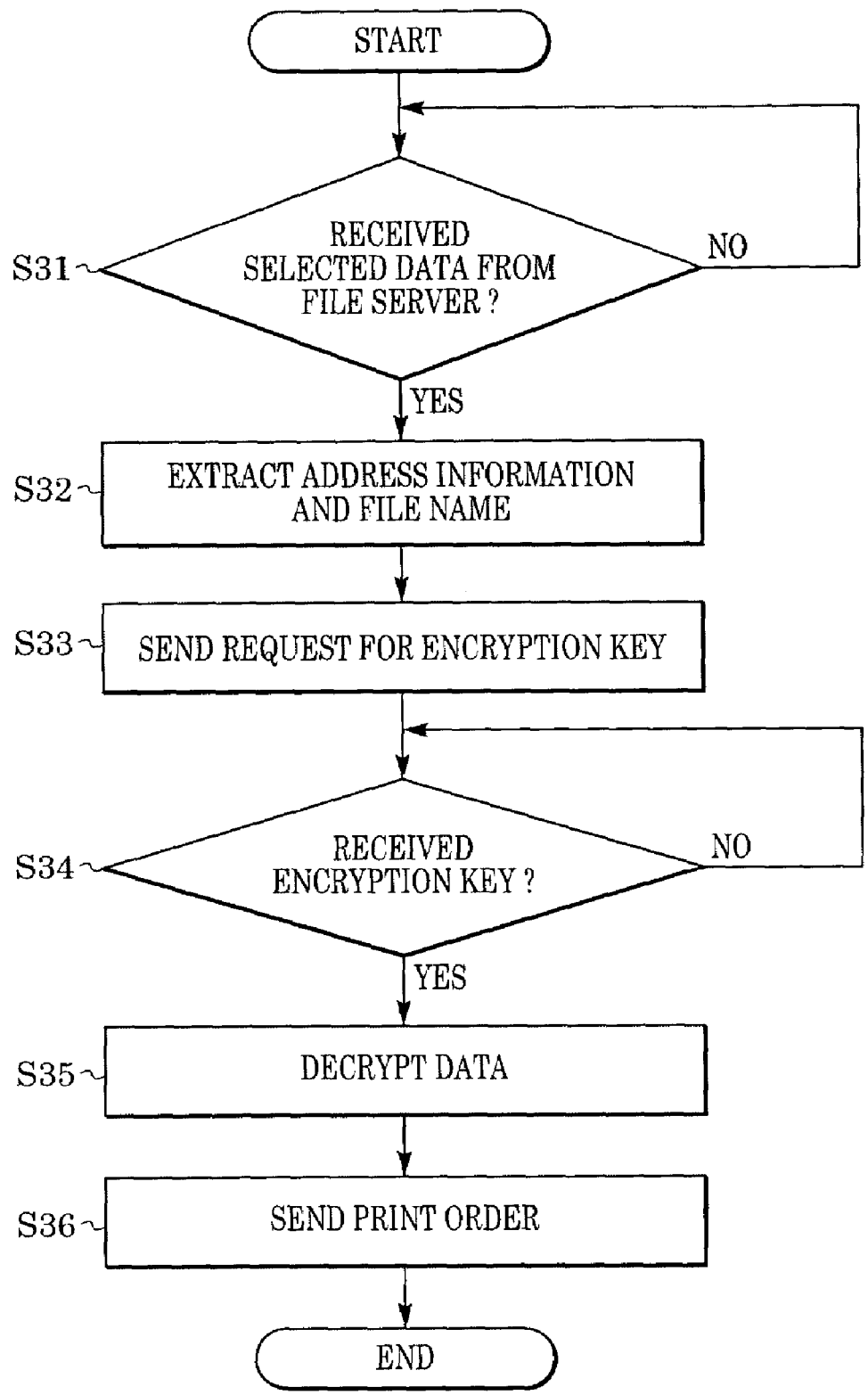

IMAGE PROCESSING SYSTEM AND METHOD FOR PROCESSING IMAGE DATA USING THE SYSTEM

This application claims priority from Japanese Patent Application No. 2003-389682 filed Nov. 19, 2003, which is hereby incorporated by reference herein.

BACKGROUND OF THE INVENTION

1. Field of the Invention

The present invention relates to an image processing system and a method for securely outputting image data.

2. Description of the Related Art

When image data such as scanned image data is uploaded from a network scanner or a multifunction peripheral (MFP) to an insecure file server for subsequent printing, the file contents are at risk of being viewed by unauthorized third parties. Japanese Patent Laid-Open No. 08-023442) discloses a known method for securing scanned image data by encryption prior to upload.

However, the disadvantage of encrypting the scanned image data prior to upload, is that the decryption key corresponding to the scanned image data cannot be securely obtained. It is assumed that the scanned image data is encrypted with the encryption key and the encrypted scanned image data is decrypted with the same encryption key.

The encryption key cannot be attached to the scanned image data, since it may become exposed to the public. Even if the encrypted scanned image data is decrypted with a decrypted key, the decrypted key cannot be attached to the scanned image data for the same reason. One method for avoiding public exposure is for the scanner and printer to share the same encryption key. However, the security level is set low since all jobs share the same encryption key.

Another method for improving security is to create different encryption keys for each job. In this method, the scanner displays a password to a user at encryption time such that the user can enter the password during printing. In another method, a printer creates and sends an encryption key to a scanner such that scanned image data is decrypted with the encryption key. Further yet, another method is provided in which a server creates and maintains encryption keys that can be shared by a scanner and a printer.

However, conventional methods have a number of disadvantages. In the case of password-protected systems, when a scanner displays the password, the user is required to remember the password. Similarly, the method where a printer creates and sends an encryption key is effective only when a printer to be used for printing is predetermined. Other printers cannot be employed and the user is required to remember which printers can be used. In the case where a server is provided, the server is likely to become a target for hacking, additional costs for installation and maintenance are required, and its address must be predetermined.

SUMMARY OF THE INVENTION

Accordingly, an object of the present invention is to address one or more disadvantages of conventional image processing systems. One advantage of the image processing system and method of the present invention is that users can perform print processing without remembering authentication information or the designated printers that can be used for printing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a screen shot of an MFP user input panel in accordance with an embodiment of the present invention.

FIG. 4 is a screen shot of an MFP user input panel showing selections of a target file server and a target folder when a user uploads data from the MFP to a file server.

FIG. 11 illustrates a table showing correspondence between file names and encryption keys.

FIG. 13 is a flowchart showing processing steps in the MFP extension unit.

DETAILED DESCRIPTION OF THE EMBODIMENTS

Embodiments of the image processing system and the method for processing image data using the system according to the present invention will now be described with reference to the accompanying drawings.

First Embodiment

Figure 1:
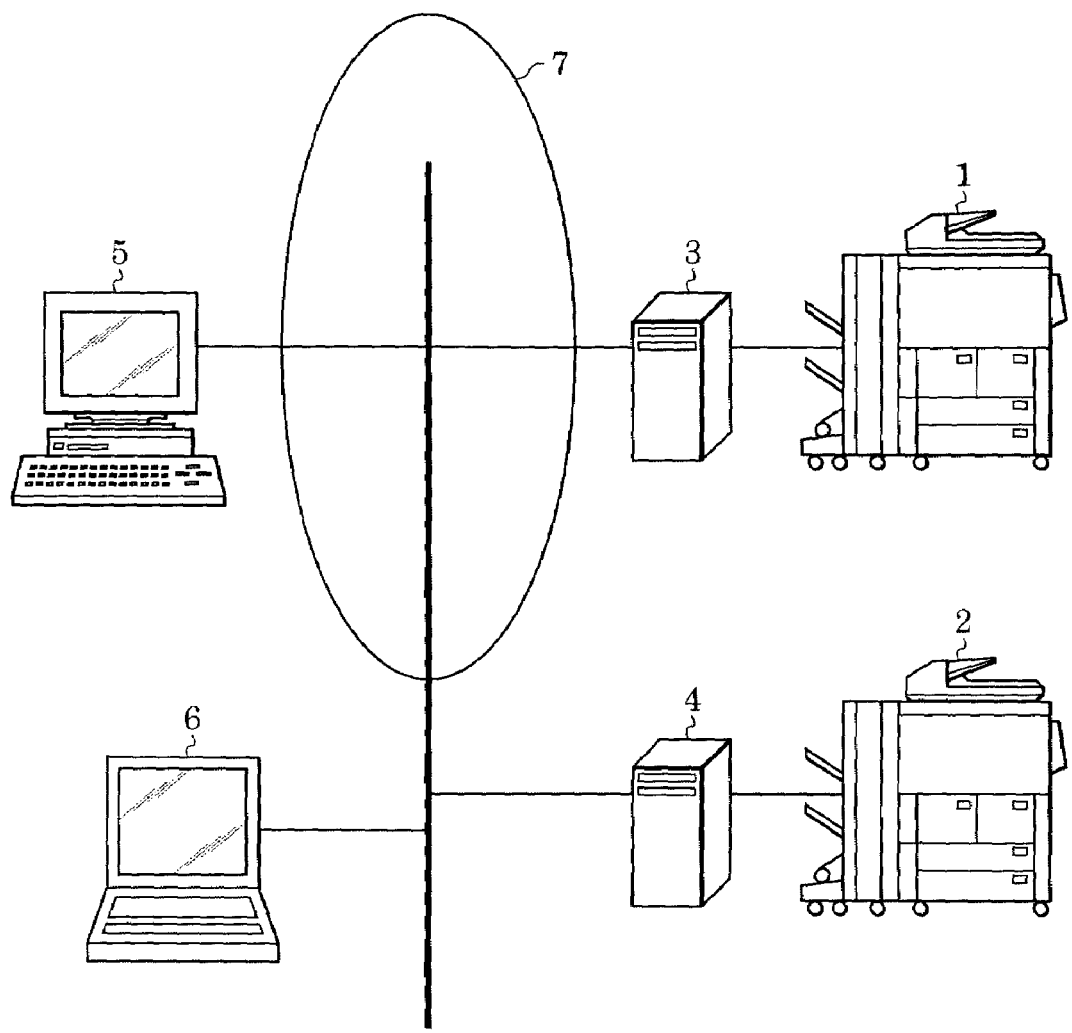
FIG. 1 shows an image processing system according to a first embodiment of the present invention.

FIG. 1 shows an image processing system according to a first embodiment of the present invention. This image processing system includes an MFP 1, an MFP 2, an MFP extension unit 3, an MFP extension unit 4, a file server 5, a terminal device 6, and a network 7 for connecting them. The MFP 1 and the MFP 2 serve as, for example, printers, copiers, facsimiles, and scanners. The MFP extension unit 3 and the MFP extension unit 4 are connected to the MFP 1 and the MFP 2, respectively, and are provided for enhancing the functions of the MFP 1 and the MFP 2. For example, functions for security improvement, high-speed image processing, and high-volume image data storage can be added.

While the MFP extension unit 3 is located between the MFP 1 and the network 7, and the MFP extension unit 4 is located between the MFP 2 and the network 7, the MFP 1 and the MFP 2 can be directly connected, through the respective MFP extension unit 3 and the MFP extension unit 4, to network equipment for data exchanges. Operating sections (user input panels) of the MFP 1 and the MFP 2 are capable of changing targets to be controlled, and accepting key entries and providing screen display for the MFP extension unit 3 and the MFP extension unit 4.

In the present embodiment, encryption/decryption of scanned image data and exchange of encryption keys are performed by the MFP extension unit 3 and the MFP extension unit 4. Although the MFP extension unit 3 and the MFP extension unit 4 are shown separately from the respective MFP 1 and the MFP 2 in FIG. 1, the MFP extension unit 3 and the MFP extension unit 4 may be integrated with the respective MFP 1 and the MFP 2. Moreover, while the MFP 1 and the MFP 2, and the MFP extension unit 3 and the MFP extension unit 4 are shown as identically structured, they may be structured differently.

The file server 5 is accessible by the terminal device 6, the MFP extension unit 3, and the MFP extension unit 4 that are connected to the network 7. The file server 5 can be accessed by any number of users and is not specifically secured.

The terminal device 6, such as a personal computer (PC) or a personal digital assistance (PDA), can access the file server 5 through the network 7. The network 7 is, for example, the Internet or an in-house local area network (LAN), which is not secured, and is connected to the MFP extension unit 3, the MFP extension unit 4, the file server 5, and the terminal device 6.

Figure 2:
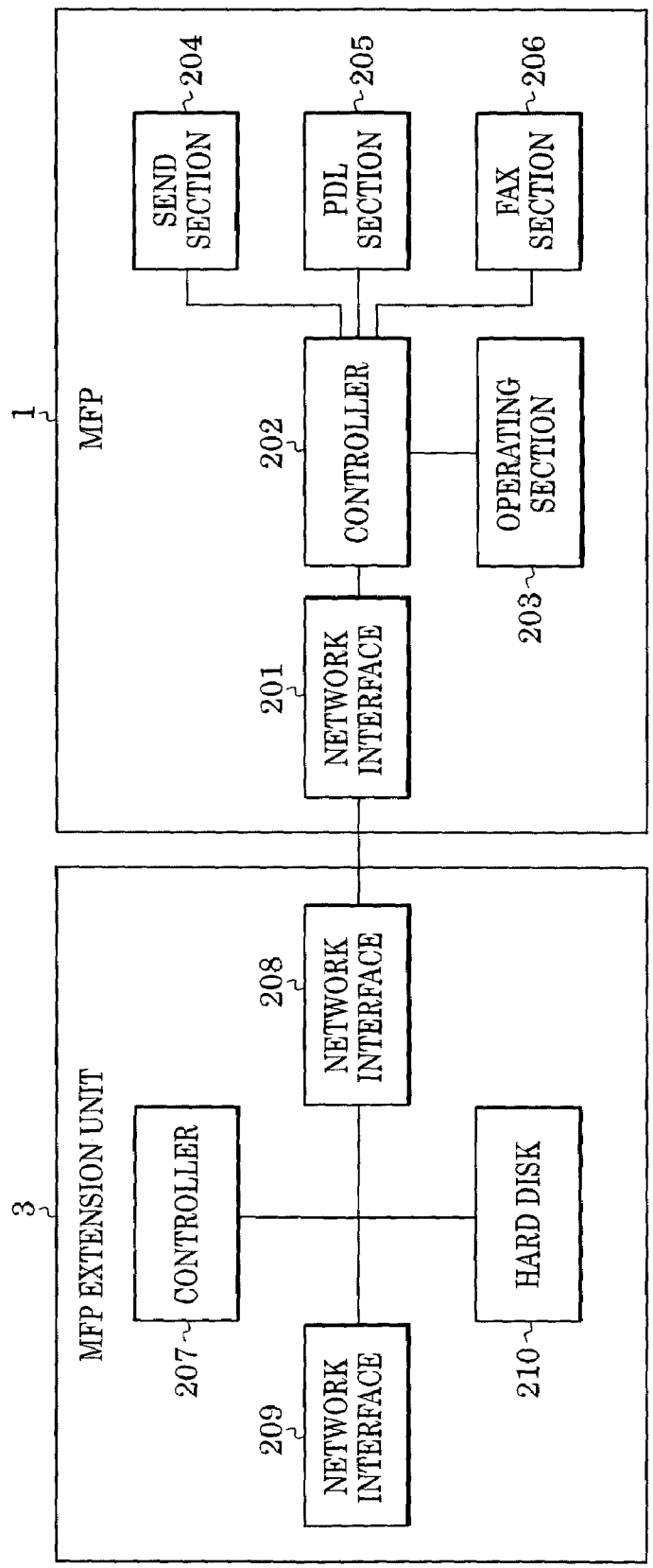
FIG. 2 is a block diagram showing components of a multifunction printer (MFP) connected to an MFP extension unit.

FIG. 2 is a block diagram showing components of the MFP 1 and the MFP extension unit 3. The MFP 1 includes a network interface 201, a controller 202, an operating section 203, a send section 204, a page-description language (PDL) section 205, and a facsimile (FAX) section 206. The MFP extension unit 3 includes a controller 207, a network interface 208, a network interface 209, and a hard disk 210.

The network interface 201 in the MFP 1 is connected to the MFP extension unit 3 using the Ethernet standard, for example. If the MFP 1 serves the functions of the MFP extension unit 3 and no MFP extension unit is provided, the network interface 201 is directly connected to the network 7. The controller 202 controls data transfer as well as operations in each block of the MFP 1. The operating section 203 (user input panel) includes a touch-panel LCD, a light emitting diode (LED), and buttons.

The send section 204 scans and converts image on a paper document into image data for transfer through the network interface 201. The PDL section 205 receives printing information from an external location through the network interface 201, converts the received printing information into image data appropriate for printing, and prints the image data on recording paper. The FAX section 206 communicates with external facsimiles.

The controller 207 in the MFP extension unit 3 controls operations of the MFP extension unit 3. The network interface 208 communicates with the MFP 1 and supports a network having the same standard as that of the network interface 201. The network interface 209 communicates with external equipment connected to the network 7. The hard disk 210 stores, for example, operating programs for the controller 207, various set values, encryption keys, operation histories, and image data.

FIG. 3 is a screen shot of the operating section 203 (user input panel) of an MFP. The operating section 203 includes mode selection buttons 401, an LCD panel 402, a numeric keypad 403, a start button 404, and a stop button 405. The mode selection buttons 401 provide four selectable modes: COPY, FAX, PRINT, and EXTENSION. When EXTENSION is selected, all buttons and the LCD panel 402 in the operating section 203 except the mode selection buttons 401 can be used to control the MFP extension unit 3.

The LCD panel 402, which is a touch panel, not only provides a screen display but also operates as input buttons. When one of the mode selection buttons 401 is selected, the screen of the LCD panel 402 is changed accordingly. The numeric keypad 403 provides buttons for entering numbers. The start button 404 is used to start the operation in each mode, while the stop button 405 is used to suspend the operation.

FIG. 4 shows a screen shot of the LCD panel 402 displaying selections of a target file server and a target folder when a user employs the operating section 203 to upload data from the MFP 1 to the file server 5. This screen is displayed by selecting EXTENSION of the mode selection button 401 a predetermined number of times. An address input field 502 for entering the address of the file server 5 and a CONNECT button 503 appear in a destination selection window 501. When the user enters the address of the file server 5 in the address input field 502 and selects the CONNECT button 503, the file server 5 is selected and the MFP extension unit 3 initiates connection with the file server 5.

When the connection is successful, a folder selection window 511 displays names of files and folders stored in the file server 5. In FIG. 4, the screen shows the address of the file server "insecure.jp" to which the MFP extension unit 3 is connected, a folder "temp", and data files "Arc1.mfp" and "Arc2.mfp".

When the folder "temp" is selected, the folder selection window 511 lists the contents of "temp". When a GO UP button 504 is selected, the contents of the parent directory are displayed. When a SELECT button 505 is selected, the data is uploaded to the currently displayed folder. Subsequently, the user places a document on the send section 204 of the MFP 1 and selects the start button 404. Thus, the document is scanned and image data read is transferred to the MFP extension unit 3 for subsequent delivery to MFP 1.

Figure 5:
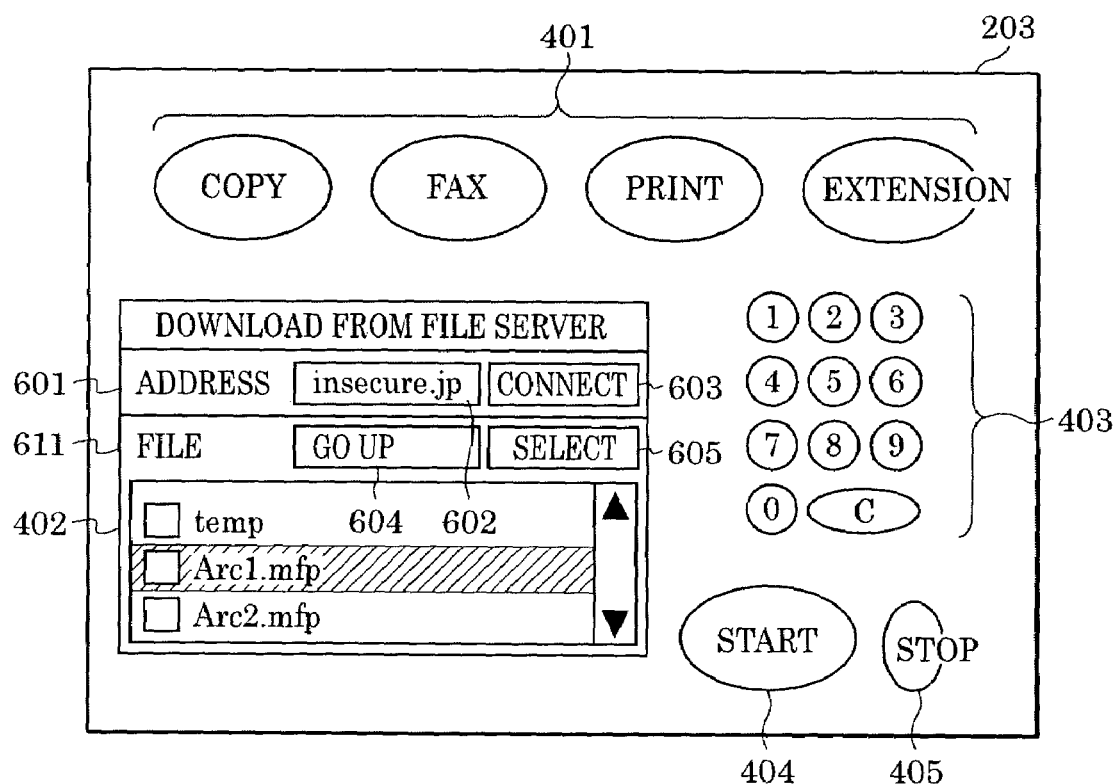
FIG. 5 shows a screen shot of an MFP user input panel displaying selections of a source file server and source folders when a user downloads data from the file server for printing.

FIG. 5 is a screen shot of the LCD panel 402 displaying selections of a source file server and source folders when a user wishes to download data from the file server 5 for printing. This screen is displayed by selecting EXTENSION in mode selection buttons 401 a predetermined number of times. An address input field 602 for entering the address of the file server 5 and a CONNECT button 603 appear in a destination selection window 601. When the user enters the address of the file server 5 in the address input field 602 and selects the CONNECT button 603, the file server 5 is selected and the MFP 2 initiates communication with the file server 5.

When the connection is successful, a folder selection window 611 displays names of files and folders stored in the file server 5. In FIG. 5, the screen shows the address of the file server "insecure.jp" to which the MFP 2 is connected, a folder "temp", and data files "Arc1.mfp" and "Arc2.mfp".

When the name of the folder "temp" is selected, the folder selection window 611 lists the contents of "temp". When a GO UP button 604 is selected, the contents of the parent directory are displayed. When the data file "Arc1.mfp" is selected, the displayed string "Arc1.mfp" is highlighted. When a SELECT button 605 is then selected, the data "Arc1.mfp" is selected as the data to be downloaded. Subsequently, the user selects a start button 404 to start downloading to the MFP extension unit 4. Then, the MFP extension unit 4 receives an encryption/decryption key from the MFP extension unit 3 and decrypts the data. The decrypted data is transferred to the MFP 2 and processed for printing.

Figure 6:
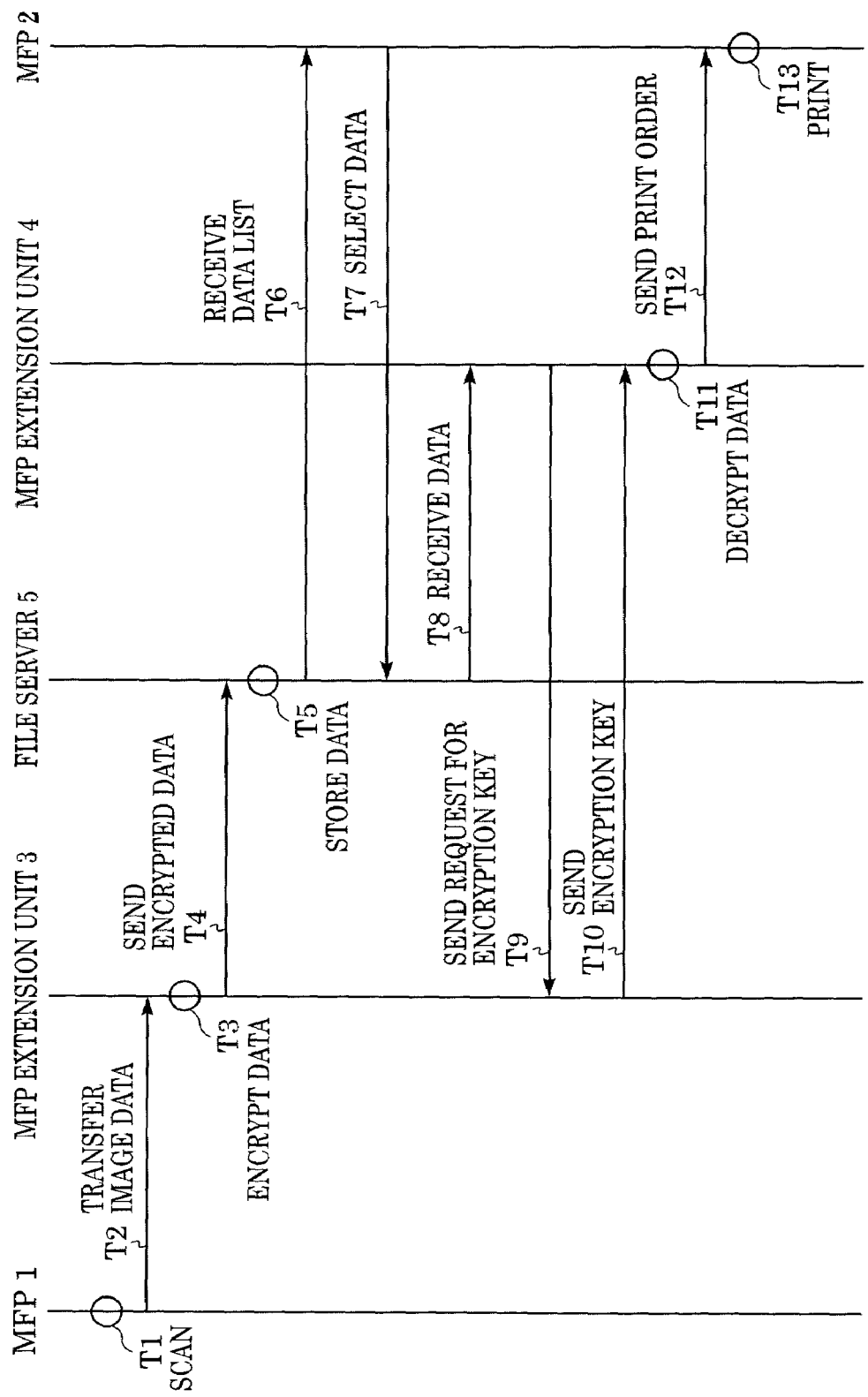
FIG. 6 shows data transfer between MFPs, MFP extension units, and a file server.

The operation in the image processing system will now be described. FIG. 6 shows data transfer between the MFP 1, the MFP 2, the MFP extension unit 3, the MFP extension unit 4, and the file server 5. A user wishing to transfer a document for later printing instructs, by using the operating section 203 of MFP 1, MFP 1 to scan (T1) a paper document, the image data of which is sent to the MFP extension unit 3 (T2). Here, the operating section 203 of the MFP 1 is controlled by the MFP extension unit 3, since this send function is processed by the MFP extension unit 3. Accordingly, even if the MFP has only a scan function, the MFP extension unit 3 provides the send function by using the MFP.

The image data is then encrypted with a unique encryption key stored in the hard disk 210 of the MFP extension unit 3 (T3). Here, the encrypted image data is given a unique file name and the address information of the network interface 209 is added to the encrypted image data. This address information is the address of a device for storing the encryption key and is used to identify the encryption key for decryption in order to perform printing.

At T4, the encrypted image data is transferred to the file server 5 for storage on a hard disk (not shown) at T5. To store the encrypted image data in the file server 5, the user enters the address information of the file server 5. Since encrypted image data is given unique file names, a plurality of images scanned in the MFP 1 can be stored in the same file server 5. In the present embodiment, all the encrypted image data shares a unique encryption key stored in the MFP extension unit 3.

A process for printing the image data stored in the file server 5 by the MFP 2 will now be described. In the operating section 203 of the MFP 2, the user enters the address information of the file server 5 to obtain a list of data files stored on the file server 5 (T6). The user selects a particular data file from the list and indicates the selected data file to the file server 5 (T7). This initiates the printing operation. The operating section 203 of the MFP 2 is controlled by the MFP extension unit 4.

Subsequently, at T8, the MFP extension unit 4 receives the selected data file from the file server 5. From the data received, the MFP extension unit 4 extracts the address information of the device storing the encryption key. Here, in the present embodiment, the address information of the MFP extension unit 3 is extracted. At T9, the MFP extension unit 4 sends a request for the encryption key to the MFP extension unit 3 (T9). Together with the request, the address information of the MFP extension unit 4 is also sent to the MFP extension unit 3. This address information is used to authenticate MFP extension unit 4 and to specify a destination of the encryption key when the MFP extension unit 3 sends the encryption key to the MFP extension unit 4 as further discussed with reference to FIG. 7. This way is more secure, because only a specific device can obtain the encryption key.

The MFP extension unit 3 receives the request for the encryption key, reads the encryption key stored in the hard disk 210, and sends the encryption key to the MFP extension unit 4 (T10). The MFP extension unit 4 receives the encryption key, decrypts the data received in the process T8 with the encryption key (T11), and transmits the decrypted data to the MFP 2, thereby sending a print order (T12). Then, the data is printed by a printer (not shown) of the PDL section 205 (T13).

Thus, an image scanned in the MFP 1 is encrypted in the MFP extension unit 3 and uploaded to the file server 5. When the user selects a file in the MFP 2, data of the image is transferred to the MFP extension unit 4, decrypted with an encryption key received from the MFP extension unit 3, and printed in the MFP 2.

Figure 7:
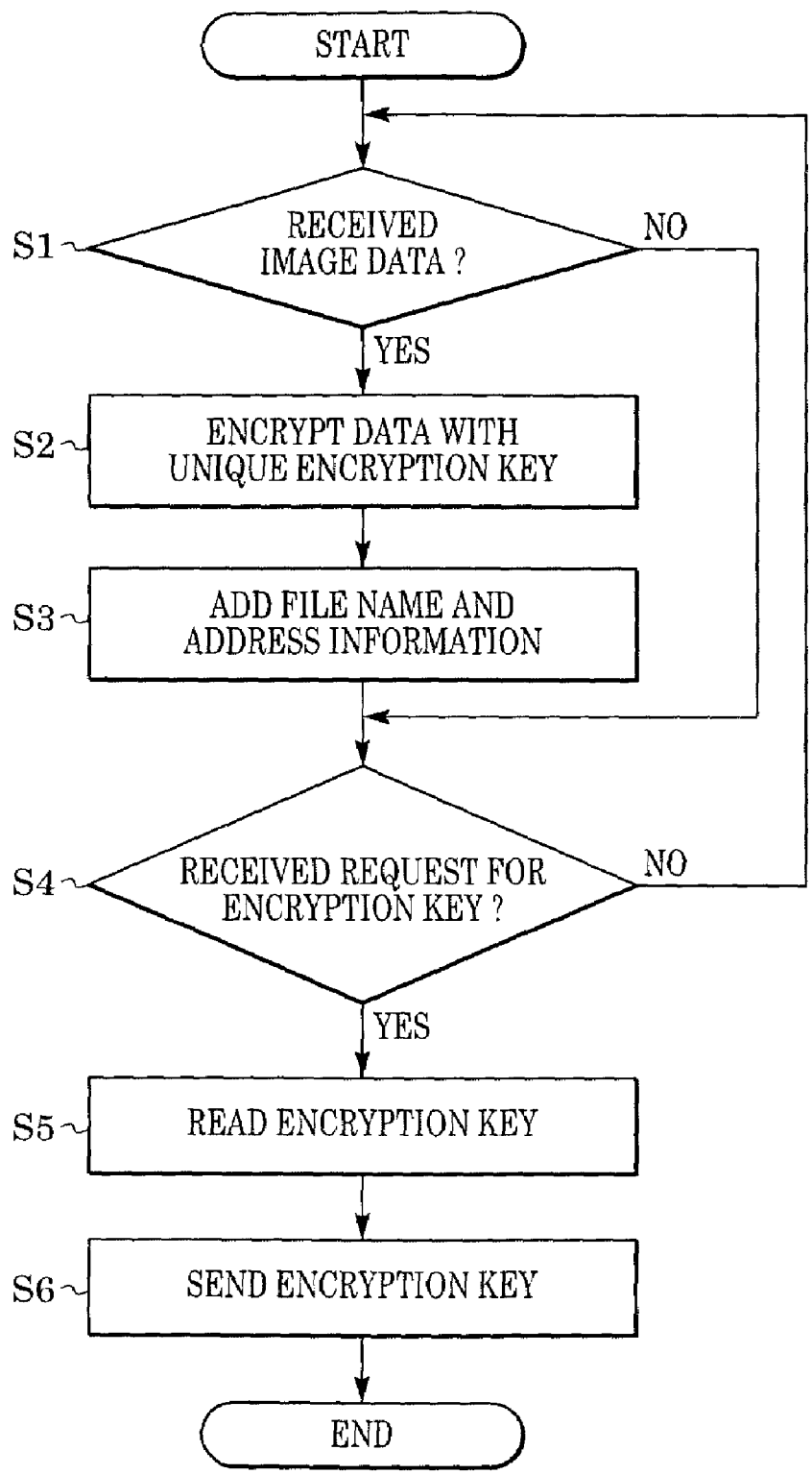
FIG. 7 is a flowchart showing processing steps in the MFP extension unit.

FIG. 7 is a flowchart showing processing steps in the MFP extension unit 3. In an exemplary embodiment, processing is accomplished via a software program stored on the MFP extension unit 3. First, it is determined whether image data generated in the MFP 1 by scanning an image is received (step S1). If no image data is received, the process continues to step S4. When image data is received, the received image data is encrypted with a common encryption key stored on the hard disk 210 (step S2). A file name and address information of the network interface 209 are added to the encrypted image data, which is then transmitted to the file server 5 (step S3).

Subsequently, it is determined whether a request for the encryption key from the MFP extension unit 4 is received (step S4). If no request is received, the process returns to step S1. If a request is received, the encryption key is read out of the hard disk 210 (step S5) and is sent to the MFP extension unit 4 based on address information received together with the request for the encryption key in step S4 (step S6). The process is thus completed. Since the MFP extension unit 3 authenticates the source of the request for the encryption key based on the address information and sends the encryption key only to registered sources, a high level of security can be achieved.

Figure 8:
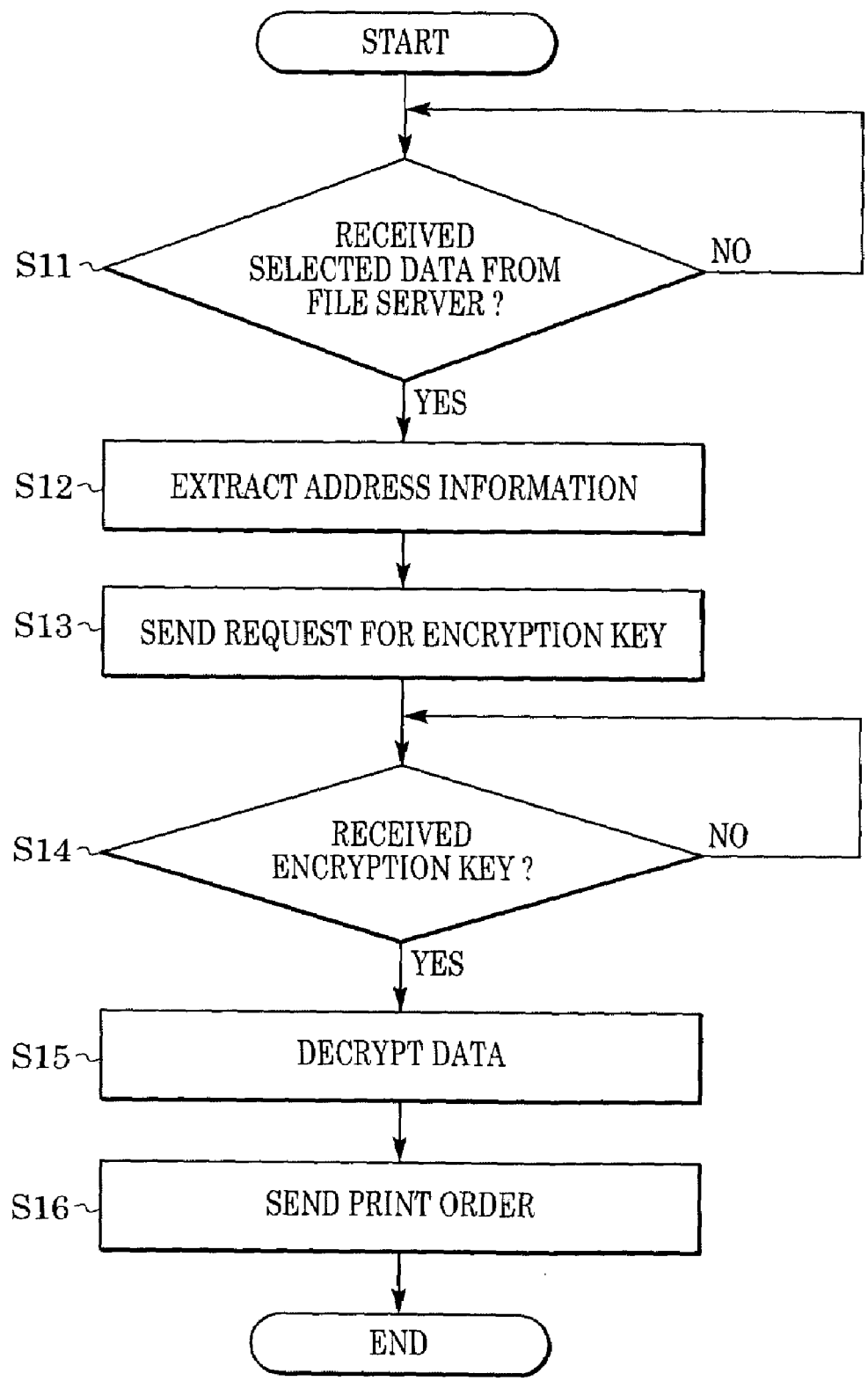
FIG. 8 is a flowchart showing processing steps in the MFP extension unit.

FIG. 8 is a flowchart showing processing steps in the MFP extension unit 4. A processing program for the MFP extension unit 4 is stored in a storage medium in the controller 207 and is executed by the controller 207. First, it is determined whether data selected by the MFP 2, which is simply referred to as "selected data," is received from the file server 5 (step S11). If selected data is not received, the process repeats. When selected data is received, address information on the MFP extension unit 3 is extracted from the selected data (step S12).

Then, the MFP extension unit 4 sends a request for an encryption key to the MFP extension unit 3 based on the address information extracted (step S13) and waits until the encryption key is received (step S14). When the encryption key is received, the MFP extension unit 4 uses the encryption (decryption) key to decrypt the selected data (step S15) and transmit it to the MFP 2, thereby sending a print order (step S16). The process is thus completed.

In the image processing system according to the first embodiment, image data is encrypted and an encryption key is stored in the MFP extension unit 3, and then the image data is uploaded to the external file server 5. To print the image data, the MFP extension unit 4 receives and uses the encryption key stored by the MFP extension unit 3 to decrypt the image data for print processing by the MFP 2. In order to exchange the encryption key, address information is included in the encrypted image data on the MFP extension unit 3. This address information is then used by the MFP extension unit 4 to request the encryption key from the MFP extension unit 3. The MFP extension unit 3 then sends the encryption key to the MFP extension unit 4 based on this address information.

The user can upload the image data to the insecure file server 5, which is located between the MFP extension unit 3 and the MFP extension unit 4, without regard to the encryption key, and can easily print the encrypted image data. Thus, security and ease of use are both ensured.

To achieve a higher level of security, communication protocols and settings on network equipment preferably place limits on devices that can send requests for encryption keys stored in the MFP extension unit 3. For example, packet filtering in a router that connects different networks can be used. In addition, a higher level of security in communication between the MFP extension unit 3 and the MFP extension unit 4 can be achieved through the use of known encryption protocols, such as the use of a virtual private network (VPN).

Second Embodiment

Figure 9:
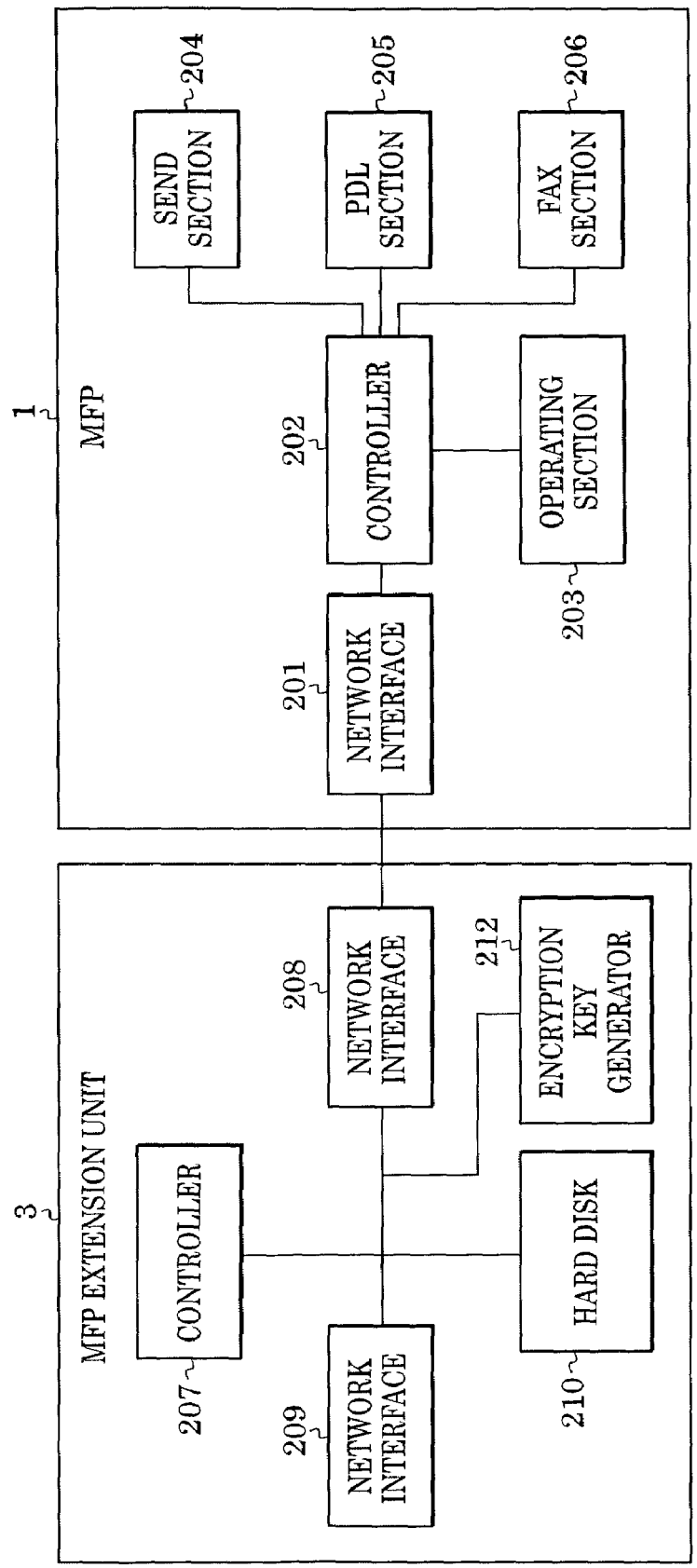
FIG. 9 is a block diagram showing components of an MFP and an MFP extension unit according to a second embodiment of the present invention.

FIG. 9 is a block diagram showing components of an MFP 1 and an MFP extension unit 3 according to a second embodiment of the present invention. Components identical to those in the first embodiment are indicated by the same reference numerals and their descriptions will be omitted. The MFP extension unit 3 includes an encryption key generator 212 in addition to a controller 207, a network interface 208, a network interface 209, and a hard disk 210. The encryption key generator 212 generates a different encryption key for each job. Since encryption keys differ from job to job, they cannot be easily decrypted, and thus a higher level of security can be achieved.

The MFP extension unit 3 adds identifiers to encrypted data for retrieving the encryption key corresponding to particular encrypted data. The MFP extension unit 3 maintains a table defining the correspondence of all identifiers of encrypted data with encryption keys. The MFP extension unit 4 receives encrypted data, extracts its identifier, and sends this identifier to the MFP extension unit 3 together with a request for the corresponding encryption key.

The MFP extension unit 3 receives the identifier, locates the encryption key in the above-described table, and sends the encryption key to the MFP extension unit 4, thereby allowing the MFP extension unit 4 to decrypt the encrypted data. In the second embodiment, file names of encrypted data serve as identifiers. The file names are unique to the MFP extension unit 3 and are provided when the MFP extension unit 3 generates the encrypted data.

Figure 10:
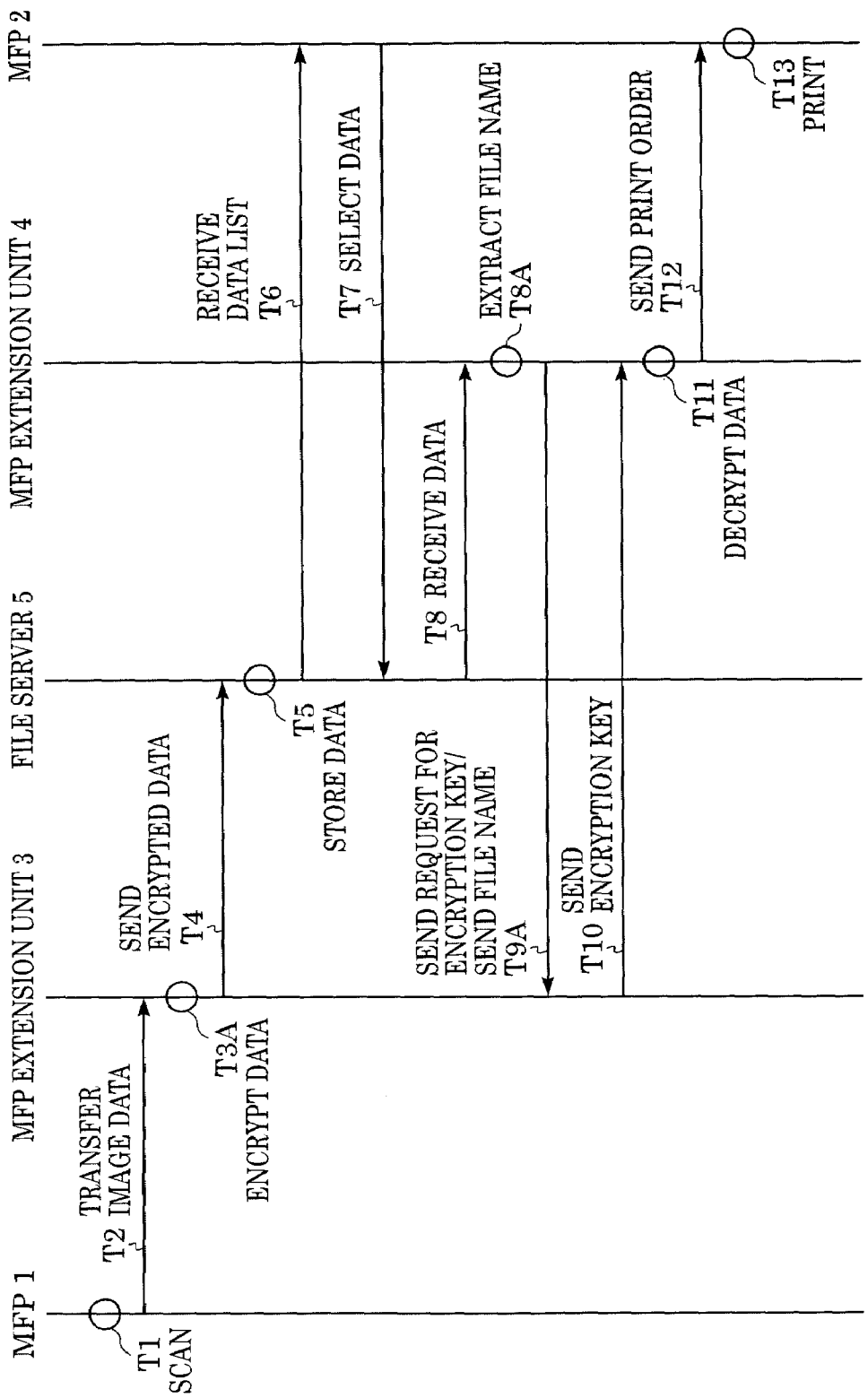
FIG. 10 shows data transfer between MFPs, MFP extension units, and a file server.

The operation in the image processing system having the above-described structure will now be described. FIG. 10 shows data transfer between the MFP 1, the MFP 2, the MFP extension unit 3, the MFP extension unit 4, and the file server 5. Here, processes similar to those of the first embodiment are indicated by the same reference numerals and their detailed description will be omitted.

The user begins by using operating section 203 to initiate scanning, wherein a paper document is scanned (T1) and image data obtained by the scanning is sent to the MFP extension unit 3 (T2). The encryption key generator 212 in the MFP extension unit 3 generates an encryption key to encrypt the image data (T3A) and the encrypted image data is given a unique file name. Here, the controller 207 adds new information to a correspondence table (see FIG. 11) stored in the hard disk 210.

For the MFP 2 to print an image stored in the file server 5, the MFP extension unit 4 receives selected data from the file server 5 (T8) and extracts not only address information on the device storing the encryption key but also a file name from the received data (T8A). Then, the MFP extension unit 4 sends an encryption key request to the MFP extension unit 3 (T9A). Together with the request, the MFP extension unit 4 sends its address information and the file name of the encrypted data. The MFP extension unit 3 receives the request for the encryption key, searches the correspondence table stored on the hard disk 210 to locate a file name matching that of the encrypted data, reads the encryption key corresponding to the file name, and sends the encryption key to the MFP extension unit 4 (T10).

FIG. 11 shows a table defining the correspondence between file names and encryption keys relating to jobs in accordance with an embodiment of the present invention. The file names are listed on the left, while the encryption keys are listed on the right. A line of information is added to the table every time a job is processed. Files are named according to certain rules so as to create file names unique to the MFP extension unit 3. That is, the prefix "C" and the suffix ".mfp" are common to all files. The second and third letters represent the month in which the file was created, the fourth and fifth letters represent the date on which the file was created, and a set of the sixth to eighth letters represents a 3-digit serial number.

Decryption cannot be accomplished if file names functioning as identifiers were erroneously changed in the file server 5. Examples of methods to prevent this include adding unique job ID numbers, which serve as identifiers, to encrypted data. Another example is setting a feature extraction function, such as a hash function, common to the MFP extension unit 3 and the MFP extension unit 4 in order to use a feature-extraction value determined from encrypted data for verification of an encryption key.

Figure 12:
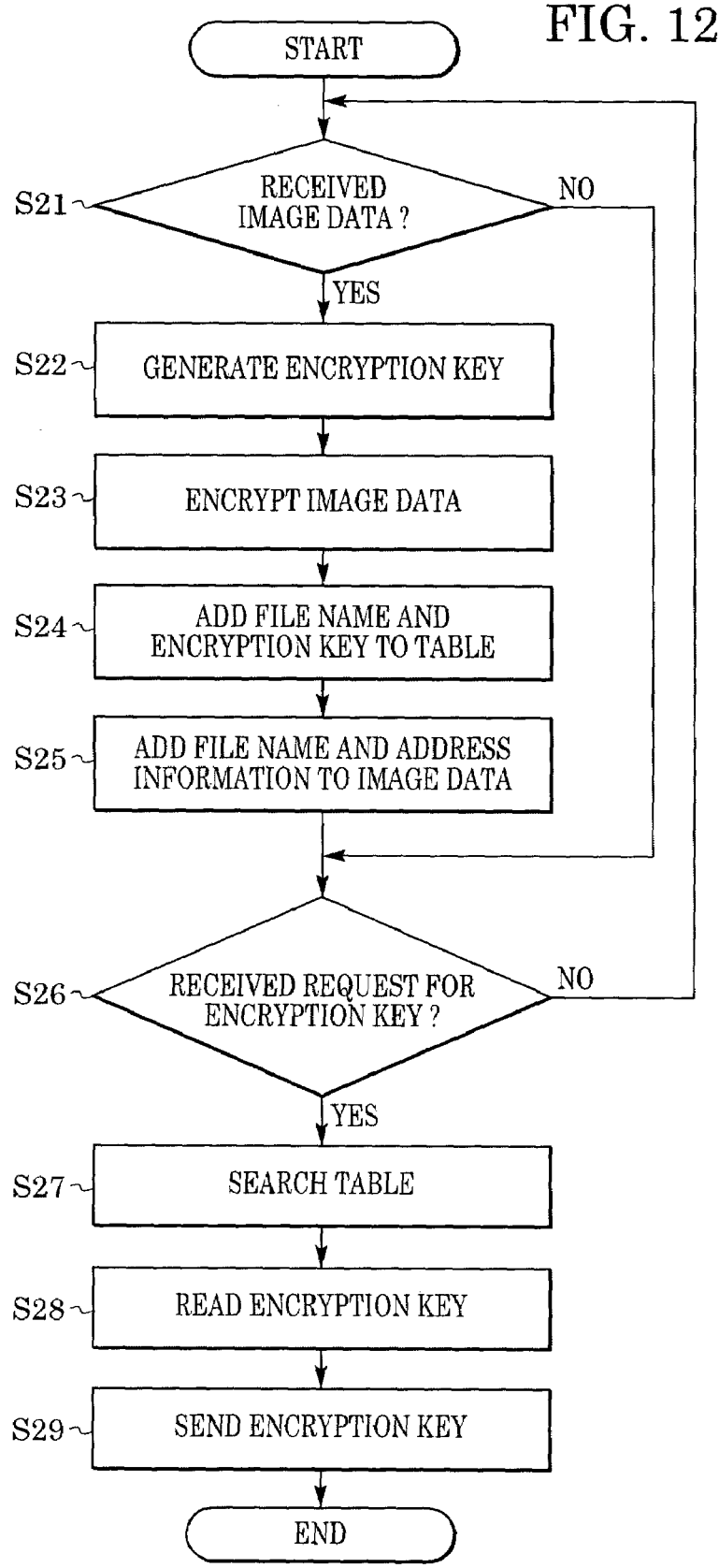
FIG. 12 is a flowchart showing processing steps in the MFP extension unit.

FIG. 12 is a flowchart showing processing steps in the MFP extension unit 3. In an embodiment, the processing steps are based on stored program code executed by the controller 207. First, it is determined whether image data generated in the MFP 1 by scanning an image is received (step S21). If no image data is received, the process continues to step S26. If image data is received, the encryption key generator 212 generates an encryption key for each job (image data) (step S22) to encrypt the received image data with the encryption key (step S23). Then, a line is added to the table to associate the file name and the encryption key (step S24). A file name and address information on the network interface 209 is added to the encrypted image data, which is then transmitted to the file server 5 (step S25).

Subsequently, it is determined whether an encryption key request is received from the MFP extension unit 4 (step S26). If no request is received, the process returns to step S21. If the encryption key request is received, the correspondence table is searched to locate the encryption key (step S27), which is then read out of the hard disk 210 (step S28). Then the encryption key is then sent to the MFP extension unit 4 (step S29). The process is thus completed. Since the MFP extension unit 3 authenticates the source of the encryption key request based on the address information and sends the encryption key only to registered sources, a high level of security can be achieved.

FIG. 13 is a flowchart showing processing steps in the MFP extension unit 4 according to an embodiment of the present invention. In this embodiment, the processing steps are based on stored program code executed by the controller 207. First, it is determined whether data selected by the MFP 2, is received from the file server 5 (step S31). If no selected data is received, the process is repeated. If selected data is received, address information on the MFP extension unit 3 and the file name of the image data are extracted from the selected data (step S32).

Then, the MFP extension unit 4 sends a request for an encryption key request to the MFP extension unit 3 based on the address information extracted (step S33) and waits until the encryption key is received (step S34). When the encryption key is received, the MFP extension unit 4 decrypts the selected data (step S35) and transmits it to the MFP 2, thereby initiating a print operation (step S36). The process is thus completed.

A higher level of security can be achieved in the present embodiment since the MFP extension unit 3 includes the encryption key generator 212 that generates a different encryption key for each image data. To further enhance security, identification information for data encrypted in the MFP extension unit 3 needs to be associated with the encryption keys and stored in the MFP extension unit 3. Then, when the MFP extension unit 4 sends an encryption key request to the MFP extension unit 3, identification information for identifying the encrypted data is added to the request. Thus, based on the identification information, the MFP extension unit 3 can select and send an appropriate encryption key to the MFP extension unit 4. While identification information for identifying data is a file name in the present embodiment, the MFP extension unit 3 needs to create unique file names to ensure proper identification. In addition to file names, examples of identification information that may be used include hash values, cyclic redundancy check (CRC) values, and time stamps on data. An advantage of the present invention is that since encryption keys differ from job to job as described above, they cannot be easily decrypted and a higher level of security can be achieved.

The present invention is not limited to the embodiments described above and is applicable to any structure that can perform the functions described in the claims and the embodiments.

For example, the MFP 1 and the MFP 2 may be integrated as a single unit and although image data is encrypted with an encryption key and decrypted with the same encryption key according to the above-described embodiments, different keys may be prepared for encryption and decryption.

For further security enhancement, the user may provide a scanning device and a printing device with information unique to the user. For example, when a first MFP generates image data by scanning an image, the user provides the first MFP (first MFP extension unit) with unique user information to identify the user. Then, the unique user information associated with an encryption key is stored in the first MFP extension unit. For printing, the user provides a second MFP (second MFP extension unit) with the same unique user information, which is then added to a request for an encryption key and sent to the second MFP extension unit. When the unique user information received matches the unique user information stored, the first MFP extension unit sends the encryption key to the second MFP extension unit.

Examples of unique user information include user IDs and passwords that can be directly entered by users, and ID cards that are often used in billing for MFPs. The ID cards are distributed to the users and used in a device, such as an MFP, with a card reader for calculating the billing information for each user. An ID number in each ID card can be used as unique user information.

Other methods for further enhancing security include exchanging encryption keys that are further encrypted. To communicate encryption keys between an MFP extension unit.(first MFP extension unit—for scanning) and an MFP extension unit (second MFP extension unit—for printing), encryption can be achieved, for example, by applying technologies of the secure socket layer (SSL) and transport layer security (TLS), which are widely used on the Internet, and by sharing a common encryption key between the first MFP extension unit and the second MFP extension unit.

Image thumbnails may be added to uploaded data to allow for easier printing. Thus, when the user wishes to print from the MFP extension unit (MFP), the user can easily locate desired data files when displayed as a list of thumbnails.

The present invention can also be achieved by supplying a storage medium storing program codes for performing the functions of the aforementioned embodiments, reading the program codes with a computer (or, for example, a CPU or a micro-processing unit (MPU)) of the system or the device, and executing the program codes. In this case, the program codes read from the storage medium implement the functions of the embodiments and the storage medium storing the program codes constitute the present invention.

Examples of the storage medium for supplying the program codes include a memory card, such as a ROM, floppy disk, PCMCIA card, and Compact Flash; an optical disk, such as a hard disk, micro-DAT, magneto-optical disk, CD-R, and CD-RW; and a phase-change optical disk, such as a DVD.

The present invention also includes the case where, for example, an operating system (OS) running on the computer carries out some or all of the processes as designated by the program codes, thereby implementing the functions of the embodiments described above.

In addition, the present invention includes the case where, after the program codes read from the storage medium are written to a function extension board mounted in the computer or in a memory incorporated in a function extension unit connected to the computer, the function extension board and, for example, a CPU of the function extension unit carry out some or all of the processes as designated by the program codes, thereby implementing the functions of the embodiments described above.

Thus, users can easily perform print processing without regard to decryption keys (encryption keys), while security in exchanging such keys is ensured. If different decryption keys are used in each image data, they cannot be easily decrypted and a higher level of security is achieved.

As many apparently widely different embodiments of the present invention can be made without departing from the spirit and scope thereof, it is to be understood that the invention is not limited to the specific embodiments thereof except as defined in the appended claims.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing system comprising:
   a data storing device;
   a first device comprising:
      an encrypting unit configured to encrypt image data generated by reading an image on a document;
      a decryption-key storing unit configured to store a decryption key for decrypting the image data encrypted by the encrypting unit; and
      a transmitting unit configured to transmit the image data encrypted by the encrypting unit to the data storing device and not to transmit the decryrtion key stored in the decryrtion-key storing unit to the data storing device; and
   a second device comprising:
      a receiving unit configured to receive the image data encrypted by the encrypting unit from the data storing device;
      a decryption-key receiving unit configured to send a request for the decryption key to the first device and receive the decryption key sent from the first device in response to the request;
      a decrypting unit configured to decrypt the image data received by the receiving unit with the decryption key received by the decryption-key receiving unit; and
      a print-processing unit configured to perform print processing on the image data decrypted by the decrypting unit.

2. The image processing system according to claim 1, wherein:
   the decryption-key storing unit stores the decryption key for each image data; and
   the decryption-key receiving unit transmits the request for the decryrmion key by sending identification information for identifying image data associated with the decryption key, and receives the decryption key corresponding to the image data identified by the identification information.

3. The image processing system according to claim 2, wherein an encryption key for the encrypting unit to encrypt image data and the decryption key for the decrypting unit to decrypt the encrypted image data are the same.

4. The image processing system according to claim 2, wherein the first device further comprises:
   an image reading device including an image reading unit configured to read an image in a document to generate image data; and
   a device including the encrypting unit, the decryption-key storing unit, and the transmitting unit.

5. The image processing system according to claim 1, wherein an encryption key for the encrypting unit to encrypt image data and the decryption key for the decrypting unit to decrypt the encrypted image data are the same.

6. The image processing system according to claim 2, wherein:
   the decryption-key storing unit stores a table defining correspondence between the image data and the decryption key.

7. The image processing system according to claim 6, wherein the transmitting unit refers to the table, based on the identification information received from the second device, and transmits, to the second device the decryption key corresponding to with the encrypted image data transmitted from the data storing unit.

8. The image processing system according to claim 6, wherein the first device further comprises:
   an image reading device including an image reading unit configured to read an image in a document to generate image data; and
   a device including the encrypting unit, the decryption-key storing unit, and the transmitting unit.

9. The image processing system according to claim 5, wherein the first device further comprises:
   an image reading device including an image reading unit configured to read an image in a document to generate image data; and
   a device including the encrypting unit, the decryption-key storing unit, and the transmitting unit.

10. The image processing system according to claim 1, wherein the first device further comprises:
    an image reading device including an image reading unit configured to read an image in a document to generate image data; and
    a device including the encrypting unit, the decryption-key storing unit, and the transmitting unit.

11. The image processing system according to claim 10, wherein:
    an operation screen provided in the image reading device for controlling the image reading device is changed for controlling the device including the transmitting unit; and
    an operation screen provided in a printing device for controlling the printing device is changed for controlling the device including the receiving unit.

12. The image processing system according to claim 10 wherein the second device further comprises:
    a printing device including a printing unit configured to print according to image data processed by the print-processing unit; and
    a device including the print-processing unit, the receiving unit, the decryption-key receiving unit, and the decrypting unit.

13. The image processing system according to claim 1, further comprising an accepting unit configured to accept unique user information, wherein:
    the decryption-key storing unit associates the accepted unique user information with the decryption key for storing; and
    the decryption-key receiving unit sends the request for the decryption key with the addition of the accepted unique user information, and receives the decryption key from the first device when the unique user information added to the request for the decryption key matches the unique user information stored in the decryption-key storing unit.

14. The image processing system according to claim 1, wherein the decryption-key receiving unit sends a request for the decryption key to an address added to the image data received by the receiving unit.

15. A method for processing image data using an image processing system in which a data storing device, a first device, and a second device are communicably connected, the method comprising:
    reading an image in a document to generate image data, in the first device
    encrypting the read image data, in the first device;
    storing a decryption key to decrypt the encryrmed image data, in the first device;
    transmitting the encryped image data to the data storing device and not transmitting the decryption key to the data storing device, in the first device;
    receiving the encrypted image data transmitted from the data storing device in the second device;
    sending a request for the decryption key to the first device and receiving the decryption key sent from the first device in to the request, in the second device;
    decrypting the encrypted image data received from the data storing device with the decryption key, in the second device; and
    performing print processing on the decrypted image data, in the second device.

16. A method for outputting, by a remote multi-function peirpheral system, image data received from a server, the image data having been encrypted by a local multi-functional system, the method comprising:
    receiving, by the remote multi-function peripheral system, a data list of encrypted image data;
    receiving, by the remote multi-function peripheral system, from the server an encrypted image data selected by a user from the data list of encrypted image data;
    transmitting, by the remote multi-function peripheral system, a request for a decryption key to the local multi-functional system, wherein the decryption key is used for decrypting the encrypted image data, and the request includes address information for authenticating the request;
    receiving, by the remote multi-function peripheral system, the decryption key from the local multi-functional system, wherein the encrypted image data is decrypted using the received decryrtion key to obtain image data; and printing, by the remote multi-function peripheral system, the obtained image data on a recording medium.

17. The method of claim 16 wherein the remote multi-function peripheral system consists of a multi-function printer and a multi-function printer extension unit.

18. The method of claim 16 further comprising:
scanning, by the local multi-function peripheral system, a document to generate image data;
encrypting, by the local multi-function peripheral system, the image data to form the encrypted image data;
receiving, by the local multi-function peripheral system, the request for the decryrtion key from the remote multi-function peripheral system;
authenticating, by the local multi-function peripheral system, the decryption key request based on the address information provided by the remote multi-function peripheral system; and
forwarding, by the local multi-function peripheral system, upon proper authentication, the decryption key for decrypting the encrypted image data, to the remote multi-function peripheral system.

19. The method of claim 18 wherein the local multi-function peripheral system consists of a multi-function printer and a multi-function printer extension unit.

* * * * *